United States Patent Office 3,194,417
Patented July 13, 1965

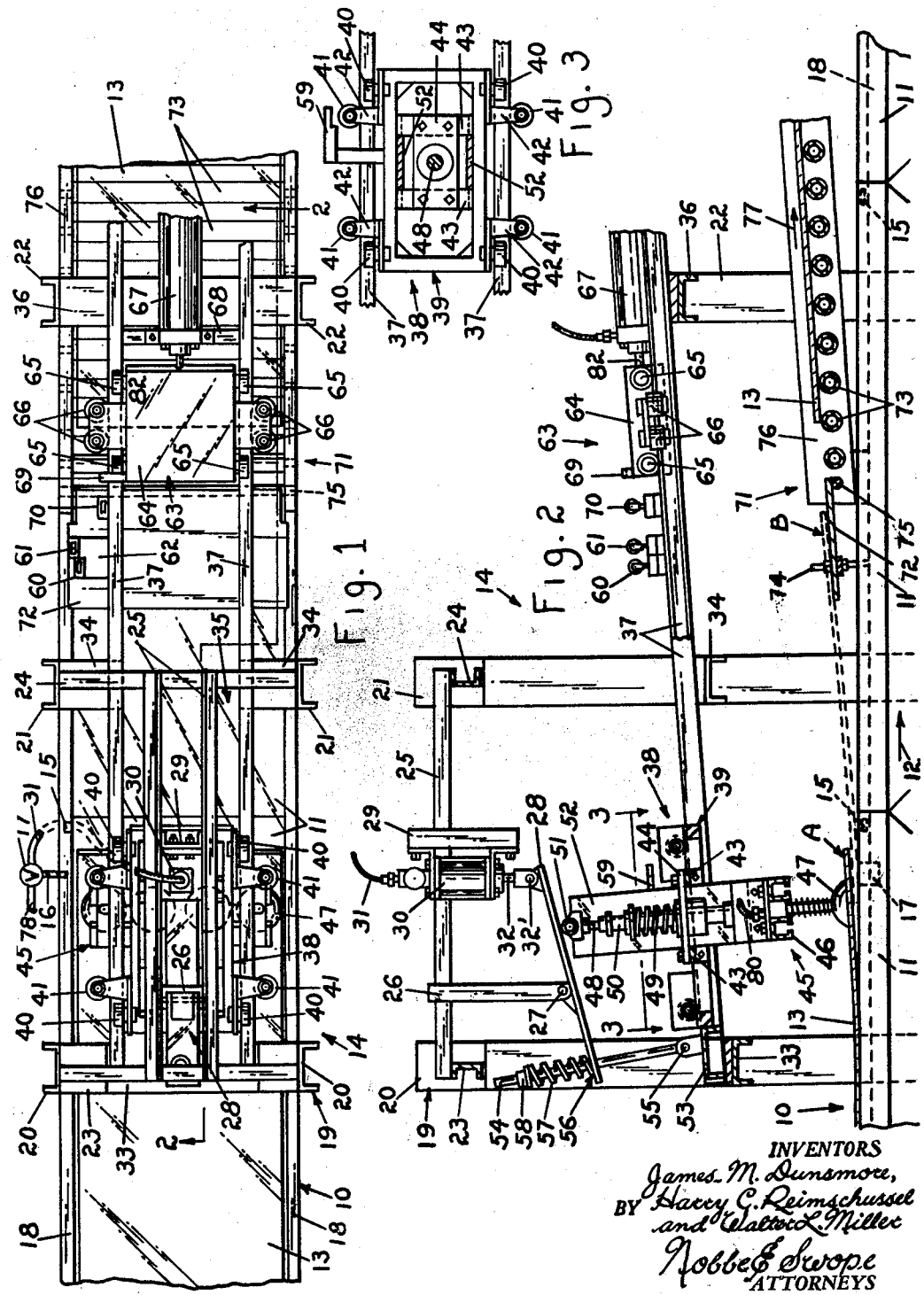

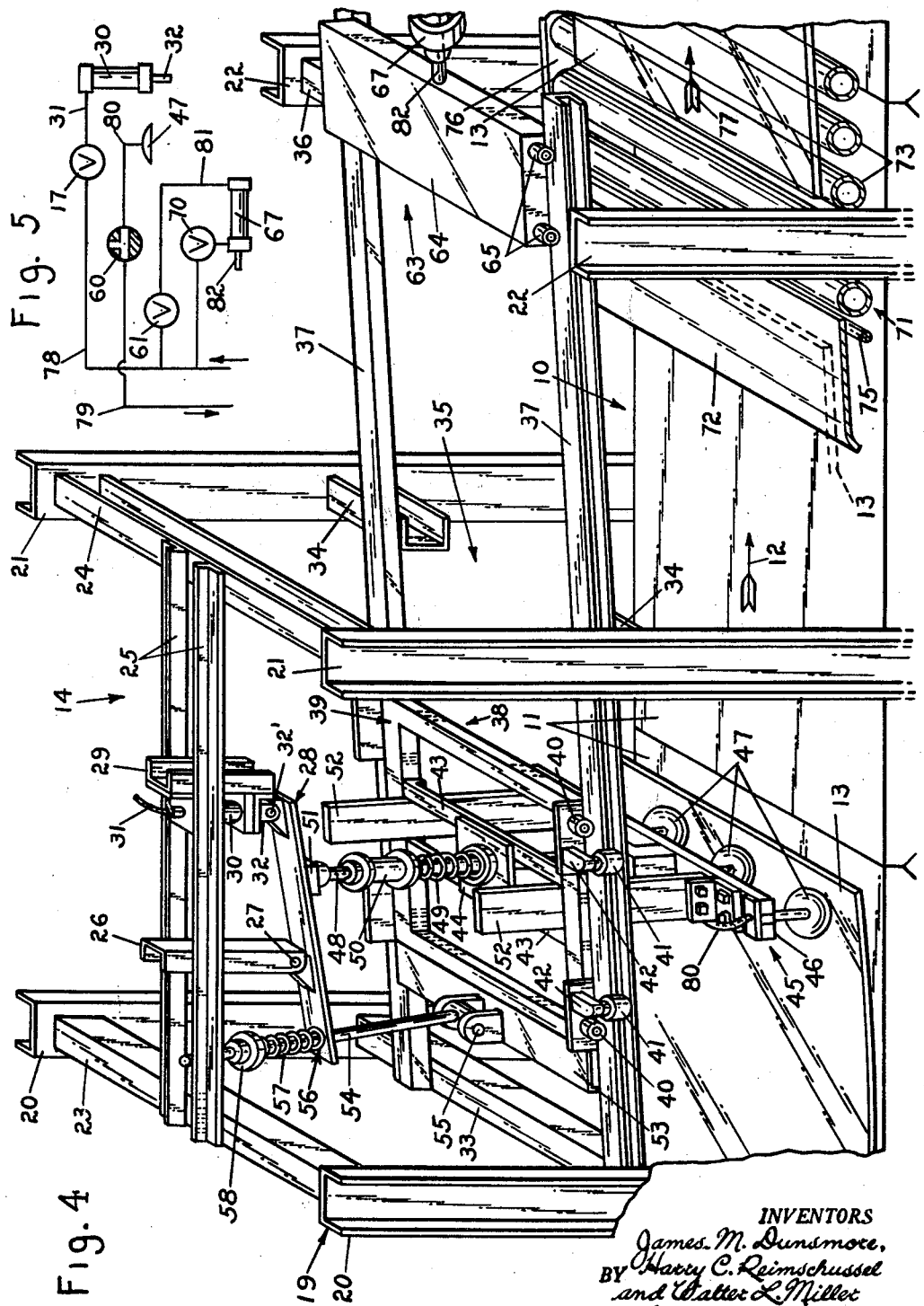

3,194,417
METHOD AND APPARATUS FOR TRANSFERRING SHEETS FROM A FIRST CONVEYOR TO A SECOND CONVEYOR
James M. Dunsmore, Harry C. Reimschussel, and Walter L. Miller, Toledo, Ohio, assignors to Libbey-Owens-Ford Glass Company, Toledo, Ohio, a corporation of Ohio
Continuation of application Ser. No. 13,512, Mar. 8, 1960. This application Aug. 3, 1964, Ser. No. 388,980
15 Claims. (Cl. 214—1)

This application is a continuation of application Serial No. 13,512, filed March 8, 1960.

This invention relates broadly to a method and apparatus for handling sheet material and more particularly to an improved method and apparatus for transferring sheet material in blank form from a first conveyor to a second conveyor.

The sheet transfer apparatus comprising the subject invention is primarily designed for use in conjunction with the table-type apparatus used extensively in the surfacing of large sheets or blanks of glass to form plate glass. This surfacing apparatus includes a plurality of work tables which are advanced in end-to-end abutting relation through a series of grinding and polishing stations. The glass blanks are bedded on the tables in a relatively thin layer of plaster of Paris, with the blanks spaced slightly from one another in end-to-end relation and the plaster of Paris bridging the spaces between adjacent blanks to form, with the upper surfaces of the blanks, a continuous surface upon which the grinding and polishing tools operate.

Upon completion of the surfacing operation, the blanks are removed from the tables as they arrive at an unloading station and the tables recycled by a conveying mechanism to a loading station.

Various devices have been heretofore proposed to remove the polished blanks from the tables, but each has required one or more operators. The transfer apparatus comprising the subject matter of this invention operates automatically and without the attention of a single operator.

It is therefore an object of this invention to provide a novel method and apparatus for automatically transferring sheet material blanks from a first conveyor to a second conveyor.

Another object of this invention is to provide transfer apparatus for elevating and advancing the lead edge of a blank above the surface of the first conveyor and depositing it upon a second conveyor.

Still another object of this invention is to provide controls for automatically cycling the transfer apparatus upon arrival of a table at the unloading station.

Other objects and advantages of the invention will become more apparent during the course of the following description when taken in connection with the accompanying drawings.

In the drawings wherein like numerals are employed to designate like parts throughout the same:

FIG. 1 is a plan view of apparatus constructed in accordance with the present invention shown in position above a series of work tables for removing the polished blanks therefrom;

FIG. 2 is a longitudinal section of the apparatus shown in FIG. 1 taken on the line 2—2 of FIG. 1;

FIG. 3 is a horizontal section taken on the line 3—3 of FIG. 2, showing the transfer carriage mounted on a pair of guide rails;

FIG. 4 is an isometric view of the transfer apparatus with some parts in section; and FIG. 5 is a diagrammatic view of the control system.

Referring now to the drawings, the numeral 10 indicates a typical conveyor system for supporting plate glass blanks during the surfacing operation. The conveyor system includes a plurality of work tables 11 which are advanced at a constant rate in the direction of the arrow 12 and in abutting end-to-end relation through a series of grinding and polishing stations in which the upper surfaces of the blanks are subjected first to the action of a plurality of grinding units and then to a series of polishing units. Each table 11 carries a plate glass blank 13 bedded in a thin layer of plaster of Paris (not shown) but which is well known in the art.

Upon completion of the surfacing operation, the tables 11 are advanced to the area of the transfer apparatus designated generally by the numeral 14. As a general rule, the surfacing operation progresses smoothly and the tables arrive in the transfer area in end-to-end abutting relation; however, at times it becomes necessary to halt a portion of the conveyor system 10 so that the tables 11 may then advance into the transfer area singly or with only two or three tables in abutting relation. Therefore, it is essential that each table initiates one complete cycle of the transfer apparatus 14.

As shown particularly in FIGS. 1 and 2, each table 11 is provided at one side thereof with a projection or lug 15 which moves along a path to engage a lever 16 to open a normally closed valve 17 mounted on the framework 18 (FIGS. 1 and 2) of the conveyor apparatus 10. This opening of the valve 17 initiates one cycle of the transfer apparatus 14 in a manner to be hereinafter fully disclosed.

The transfer apparatus 14 is suspended on a structural framework 19 above the tables 11 and which includes the pairs of upright channels 20, 21 and 22 with each pair straddling the framework 18 of the conveyor system 10. The upright pairs of channels 20 and 21 are respectively connected together adjacent their upper ends by horizontal cross-channels 23 and 24 which, in turn, support a pair of spaced, parallel angle irons 25 which are spaced on either side of the longitudinal centerline of the conveyor system 10. Secured between the angle irons 25 and depending therefrom is a relatively short channel iron 26, the lower end of which forms a fulcrum 27 to which is pivoted a substantially horizontal lever 28 intermediate the ends thereof. A second short channel iron 29 is also secured to and depends from between the angle irons 25, spaced from the channel iron 26 in the direction of the uprights 21 and supports a vertically mounted air cylinder 30 which, as is shown in FIG. 1, is connected by a hose 31 to the valve 17. The piston rod 32 of the air cylinder 30 is pivotally connected at its lower end to the adjacent end of the lever 28 as at 32'. The opposite end of the lever 28 extends beyond the fulcrum 27 for a purpose to be hereinafter described.

A second horizontal cross-channel 33 is secured to the spaced uprights 20 between the cross-channel 23 and the upper surface of the tables 11. Carried by and extending inwardly from the spaced uprights 21 at an elevation slightly above the cross-channel 33 are a pair of stub channels 34 which provide a central opening or gap 35 therebetween of substantial width for a purpose to be later disclosed. The third pair of spaced uprights 22 are joined together adjacent their upper ends by a cross-channel 36 which, together with the cross-channel 33 and the stub channels 34 support a pair of spaced, parallel, longitudinally extending rails 37 made of channel iron, one being positioned at either side of the gap 35, and with their top surfaces inclined upwardly from the cross-channel 33 to the cross-channel 36 at a relatively low angle. As shown in FIGS. 1, 2 and 4, the rails 37 project beyond the uprights 22 and since they do not support any appreciable weight in this area may either terminate in space or be supported upon a cross-channel carried by a fourth pair of spaced uprights.

Mounted to travel along the rails 37 is a transfer carriage 38 including a horizontal rectangular skelton-type frame 39 provided at its opposite ends with rollers 40 which support the carriage 38 for movement along the rails 37, with the frame proper confined within the gage of the rails. In addition to the supporting rollers 40, four guide rolls 41 depend from a like number of brackets 42 projecting outwardly in pairs from the opposite ends of the frame 39 to engage the outer edges of the rails 37 to stabilize the movement of the carriage 38 as it travels along the rails 37. A pair of spaced transverse bars 43 extend between the opposite ends of the frame 39 and support thereon a bearing plate 44.

Mounted above the path of travel of the tables 11 is a vacuum frame 45, which includes a longitudinally divided bar 46 extending transversely with respect to the tables and a plurality of vacuum operated cups 47 depending from the bar 46 in spaced relation to one another, and suspended from the transfer carriage 38. The suspension apparatus for the vacuum cups 47 includes a substantially vertical shaft 48 secured to the bar 46 intermediate the ends thereof and extending upwardly through the bearing plate 44. A spring 49, encircling shaft 48, is compressed between the upper surface of the bearing plate 44 and the lower end of a spring retainer 50 which is fixed to the shaft 48 in any convenient manner, such as by a pin or screw threads. The upper end of the shaft 50 is capped, as indicated at 51, to provide a surface which minimizes friction and wear due to sliding engagement thereof with the underside of the lever 28.

A pair of vertical guide bars 52 are secured at their lower ends to the top of the horizontal bar 46 at opposite sides of the shaft 48 and extend upwardly within the carriage frame 39 between the spaced members 43, as best shown in FIG. 4. These guide bars serve to prevent rotation of the vacuum frame 45 about the shaft 48 and also assist in guiding the vacuum frame 45 vertically when picking up the lead edge of a blank as well as during the transfer movement of the carriage which will be described in detail hereinafter.

Extending between the rails 37 above the rail support channel 33 and serving as a stop for the carriage 38 upon the return movement thereof during each transfer cycle is a transverse channel 53. A vertical rod 54 is pivotally supported at its lower end upon stop channel 53, intermediate the ends thereof, by a pivot 55 and extends upwardly through an opening 56 adjacent the end of the lever 28. A spring 57 encircles the rod 54 and is compressed between the upper surface of the lever 28 and the lower end of a retainer 58 fixed on the rod 54 adjacent its upper end.

An arm 59 (FIGS. 2 and 3) projects laterally from one side of the carriage 20 over the adjacent rail 37 to successively engage valves 60 and 61 (FIG. 5) mounted on a bracket 62 fastened to the outer edge of the said rail upon forward movement of the carriage along the rails 37.

The apparatus for initiating the return movement of the transfer carriage 38 is indicated generally by the numeral 63 and comprises a pusher frame 64, substantially spanning the space between the rails 37 and supported for movement along the said rails by rollers 65. If required, additional guide rolls 66 may be employed which bear against the outside of the rails 37 (FIGS. 1 and 2) to stabilize the travel of the pusher frame 64. A double acting air cylinder 67 is mounted on transverse beams 68 (FIG. 1) spanning the rails 37 and is connected to the pusher frame 64 by means of the piston rod 82 operating within cylinder 67. As shown in FIGS. 1 and 2, an arm 69 projects upwardly and outwardly from one side of the pusher frame 64 and is movable therewith into and out of operative engagement with a valve 70 mounted on the adjacent rail 37 to retract the pusher frame 64.

An inclined conveyor 71 mounted beneath the pusher frame 64 in relatively close proximity to the tables 11 is provided for receiving the glass blanks 13 from the tables 11 and for transporting them to other processing apparatus. The conveyor comprises a stationary apron 72 and a plurality of conveyor rolls 73. The forward or lead edge of the apron 72 is located approximately three feet from the sheet pick-up position normally occupied by the vacuum frame 45 as shown in FIGS. 1, 2 and 4 and is adjustably held in spaced relation to the upper surfaces of the tables 11 by a pair of jackscrews 74 (FIG. 2) which pivot the apron 72 about a rod 75 fastened to the rear edge of the apron and journaled in a framework 76 for the conveyor 71. The rolls 73 of the conveyor 71 are also journaled at their opposite ends in the framework 76 and form an incline progressing upwardly from the pivot rod 75 of the apron 72 and are driven at a rate in excess of the rate at which the tables 11 are moved forwardly to carry the blanks 13 rapidly in the direction of the arrow 77 (FIGS. 2 and 4).

As above described, in the continuous surfacing of plate glass blanks, a glass blank 13 is bedded in a layer of plaster of Paris on each table 11 and moved forwardly through the grinding and polishing stations and after being polished, the glass is transferred to the power driven roller conveyor 71 by the transfer apparatus 14 in the following manner. When a table 11 advances to a point adjacent the valve 17 the projection 15 on the side of the table opens the said valve to admit air from the supply line 78 (FIG. 5) into the cylinder 30 in a direction which extends the piston rod 32, thereby transmitting a downwardly directed force to rock the lever 28 about its pivot point 27 to cause the shaft 48 to depress the vacuum frame 45 and firmly press the vacuum cups 47 against the upper surface of the glass blank 13 adjacent the lead edge thereof. Each of the vacuum cups 47 is connected to an evacuating line 79 by a hose 80 so that the cups 47 are attached to the blank 11 by virtue of the applied vacuum. The valve 60, which is of the three-way type, is interposed in the evacuating line 79. As previously disclosed, the vacuum frame 45 is supported by the transfer carriage 38 and upon engagement of the vacuum cups with the glass sheet the carriage is pushed along the rails 37 by the continued forward movement of the tables 11 and the glass blanks 13.

As the table 11 advances forwardly it moves the projection 15 out of engagement with the valve 17 permitting the latter to close, thereby releasing the pressure within the cylinder 30. Springs 49 and 57 then act to rotate the lever 28 in a counter-clockwise direction (FIG. 4) to retract the piston rod 32 and the spring 49 also raises the vacuum frame 45 sufficiently to break the lead or forward edge of the glass blank 13 loose from the bedding material; however, the blank is bent by its own weight so that the major portion thereof remains in contact with the table 11 and bedded in the plaster. Continued forward movement of the table 11 pushes the carriage 38 along the inclined rails 37, progressively raising the lead edge of the blank 13 and loosening an ever increasing portion of the sheet from the bedding material. As shown particularly in FIG. 2, the blank 13 is advanced from the solid line position A at the left to the broken line position B with the lead edge of the blank passing over the apron 72.

When the blank 13 has been moved to the broken line position B in FIG. 2, the arm 59 on the transfer carriage 38 opens the valve 60 to vent the vacuum line 79 which interrupts the vacuum to each of the vacuum cups 47 thereby releasing the blank 13 which drops a short distance onto the apron 72. However, the major portion of the blank 13 is still in contact with the table 11 and the continued forward motion of the table pushes the blank onto the power driven rolls 73 of the conveyor 71. When the blank 13 is engaged by a sufficient number of rolls 73 to overcome the surface friction between the blank and the table, the conveyor 71 will propel the blank forwardly at an accelerated rate in the direction of the arrow 77 (FIGS. 2 and 4).

Either simultaneous with or shortly after the blank 13 has been released from the vacuum frame 45, the arm 59 on the transfer carriage 38 engages and opens the valve 61 to admit air from the supply line 78 through a line 81 into the cylinder 67 so as to extend the piston rod 82 in a short but rapidly executed stroke. The pusher frame 64 which is attached to the piston rod 82 engages the transfer carriage 38 and gives the carriage a shove sufficient to return the carriage to the position in FIGS. 2 and 4.

The initial return movement of the carriage 38 moves the arm 59 out of contact with valves 60 and 61 which return to their original positions thereby applying a vacuum to the cups 47 and halting the flow of air through line 81 into the cylinder 67.

When the arm 59 on the pusher frame 64 engages and opens valve 70, air pressure is admitted to the opposite end of the cylinder 67 to retract the piston rod 82 and the pusher frame 64, thereby completing a transfer cycle.

It is to be understood that the form of the invention herewith shown and described is to be taken as an illustrative embodiment only of the same, and that various changes in the shape, size and arrangement of parts, as well as various procedural changes may be resorted to without departing from the spirit of the invention.

We claim:

1. In sheet transfer apparatus of the character described, a first conveyor moving forwardly along a predetermined path and carrying a sheet therealong, a second conveyor mounted above the path of travel of the first conveyor and inclining forwardly and upwardly in the direction of movement of said first conveyor, a transfer carriage mounted above said first conveyor for movement along a path inclined forwardly and upwardly from said first conveyor to overlie an initial portion of said second conveyor, and means carried by said transfer carriage for engaging the lead end of the sheet on said first conveyor to move said transfer carriage and lead end of the sheet forwardly and upwardly along said inclined path in response to continued forward movement of said sheet along said first conveyor and deposit said lead end upon said initial portion of said second conveyor.

2. In sheet transfer apparatus of the character described, a first conveyor moving forwardly along a substantially horizontal path and supporting a sheet horizontally thereon, a second, inclined conveyor mounted above the path of travel of the first conveyor and inclining forwardly and upwardly from the direction of movement of said first conveyor, and means for engaging and elevating the lead end of the sheet from the first conveyor and depositing it upon the second conveyor upon continued forward movement of said first conveyor, said means for elevating the lead end of the sheet including a pair of spaced rails extending longitudinally of the path of travel of the first conveyor and inclining forwardly and upwardly to overlie an initial portion of said second conveyor, a carriage supported upon and movable along said rails, and means carried by said carriage for engaging the lead end of the sheet when the carriage is at the lower ends of said rails to lift the sheet from the first conveyor.

3. In sheet transfer apparatus as defined in claim 2, in which the means for engaging the lead end of the sheet includes a frame, and a plurality of vacuum cups carried by said frame and disposed transversely of the path of travel of the first conveyor.

4. In sheet transfer apparatus of the character described, a first conveyor moving forwardly along a substantially horizonal path, a work table carried by said first conveyor and supporting a sheet horizontally thereon, a second, inclined conveyor mounted above the path of travel of the first conveyor and inclining forwardly and upwardly from the direction of movement of said first conveyor, and means for engaging and elevating the lead end of the sheet from the first conveyor and depositing it upon the second conveyor upon continued forward movement of said first conveyor, said means for elevating the lead end of the sheet including a pair of spaced rails extending longitudinally of the path of travel of the first conveyor and inclining forwardly and upwardly to overlie an initial portion of said conveyor, a carriage supported upon and movable along said rails, means carried by said carriage for engaging the lead end of the sheet when the carriage is at the lower ends of said rails to lift the sheet from the first conveyor, said last-named means including a frame and a plurality of vacuum cups carried by said frame and disposed transversely of the path of travel of the first conveyor, and means actuated by said work table for applying a vacuum to said vacuum cups.

5. In sheet transfer apparatus as defined in claim 4, including means actuated by the work table for pressing the vacuum cups against the upper surface of the lead end of the sheet when said carriage is at the lower ends of said rails.

6. In sheet transfer apparatus as defined in claim 4, including means actuated by said carriage when the carriage is at the upper end of said rails to interrupt said vacuum and release the lead end of the sheet onto the initial portion of said inclined conveyor.

7. In sheet transfer apparatus as defined in claim 6, including means actuated by the carriage for returning said carriage to the lower end of said rails after releasing the lead end of said sheet.

8. In sheet transfer apparatus as defined in claim 7, in which said carriage is mounted for free movement on the rails and said carriage return means includes a pusher frame independent from said carriage and movable along the upper ends of said rails, a cylinder carried by said rails and having a reciprocating piston rod attached to said pusher frame, means for connecting opposite ends of said cylinder to a compressed air source, and a pair of valves adjacent the upper end of said rails operable in sequence by said carriage and said pusher frame for alternately admitting air from said source to opposite ends of said cylinder to extend and retract said piston rod.

9. In sheet transfer apparatus as defined in claim 8, in which the means for pressing the vacuum cups against the upper surface of the sheet includes a cylinder, a piston rod mounted in said cylinder and operable to depress said frame, means connecting one end of said cylinder to a compressed air source, a valve interposed in said connecting means, and means carried by the first conveyor for opening said valve.

10. The combination with apparatus for surfacing glass sheets including a plurality of tables arranged in end-to-end relation and movable along a horizontal path with each table supporting a sheet on its upper surface, of an inclined conveyor mounted above the path of travel of said tables and inclining forwardly and upwardly in the direction of movement of the tables, with its lower end in relatively close proximity to the upper surface of the tables, and a carriage mounted above the path of travel of the tables, said carriage having means for engaging the lead end of each sheet above the surface of its supporting table and being adapted to move forwardly and upwardly in response to continued movement of said table to deposit said lead end upon the initial portion of said inclined conveyor, whereby further movement of the table causes the sheet to be removed therefrom onto said inclined conveyor.

11. The combination with apparatus for surfacing glass sheets including a plurality of tables arranged in end-to-end relation and movable along a horizontal path, with each table supporting a sheet on its upper surface, of an inclined conveyor mounted above the path of travel of said tables and inclining forwardly and upwardly in the direction of movement of the tables with its lower end in relatively close proximity to the upper surface of the tables, a pair of spaced parallel rails extending longitudinally of the path of travel of the tables, said rails inclining forwardly and upwardly in the direction of movement of the tables, with their upper ends overlying the initial portion of said inclined conveyor, a carriage mounted for movement along said rails, and means for attaching said carriage to the lead end of a sheet on one of the tables when said carriage is at the lower ends of said rails, means for operating said last-named means to elevate the lead end of the sheet from the table and carry it forwardly upon continued movement of the table to a position above the initial portion of said inclined conveyor, and means for releasing said sheet when the lead end thereof is located above the initial portion of said inclined conveyor.

12. Apparatus for surfacing glass sheets including a plurality of tables arranged in end-to-end relation and movable along a substantially horizontal path, each said table supporting a sheet on its upper surface, a conveyor mounted above the path of travel of said tables and inclining forwardly and upwardly in the direction of movement of the tables with its lower end in relatively close proximity to the upper surface of the tables, a transfer carriage mounted above the path of said tables for movement along a path inclined forwardly and upwardly from the path of said tables to overlie an initial portion of said conveyor, and means carried by said transfer carriage for engaging the lead end of each sheet on its supporting table to move said transfer carriage and lead end of said engaged sheet forwardly and upwardly along said inclined path in response to continued forward movement of said engaged sheet on said table and deposit said lead end upon said initial portion of said conveyor.

13. In sheet transfer apparatus of the character described, a first conveyor moving forwardly in a horizontal path and carrying a work table supporting a sheet horizontally thereon, a second inclined conveyor mounted above the path of travel of the first conveyor and inclining forwardly and upwardly in the direction of movement of said first conveyor, means for engaging and elevating the lead end of the sheet from the first conveyor and depositing it upon the second conveyor upon continued forward movement of said first conveyor, said means for elevating the lead end of the sheet including a pair of spaced rails extending longitudinally of the path of travel of the first conveyor and inclining forwardly and upwardly to overlie an initial portion of said second conveyor, a carriage supported upon and movable along said rails, means carried by said carriage for engaging the lead end of the sheet when the carriage is at the lower ends of said rails to lift the sheet from the first conveyor, said means for engaging the lead end of the sheet including a frame and a plurality of vacuum cups carried by said frame and disposed transversely of the path of travel of the first conveyor, means actuated by said work table for applying a vacuum to said vacuum cups and for pressing the vacuum cups against the upper surface of the lead end of the sheet when said carriage is at the lower ends of said rails, said means for pressing the vacuum cups against the upper surface of the sheet including a cylinder, a piston rod mounted in said cylinder and operable to depress said frame, means connecting one end of said cylinder to a compressed air source, a valve interposed in said connecting means, and means carried by said work table for opening said valve, and spring biased means for retracting said piston rod when the pressure to said cylinder is interrupted.

14. The combination with apparatus for surfacing glass sheets including a plurality of tables arranged in end-to-end relation and movable along a horizontal path, with each table supporting a sheet on its upper surface, of an inclined conveyor mounted above the path of travel of said tables and inclined forwardly and upwardly in the direction of movement of the tables with its lower end in relatively close proximity to the upper surface of the tables, a pair of spaced parallel rails extending longitudinally of the path of travel of the tables, said rails inclining forwardly and upwardly in the direction of movement of the tables, with their upper ends overlying the initial portion of said inclined conveyor, a carriage mounted for movement along said rails, means for attaching said carriage to the lead end of a sheet on one of the tables when said carriage is at the lower ends of said rails including a vertically reciprocable frame mounted on said carriage and spanning the width of the sheet, a plurality of vacuum cups carried by said frame in spaced relation transversely of said sheet, means for evacuating said cups, a cylinder carried by the carriage and including a vertically reciprocable piston rod for depressing said frame to move the vacuum cups into engagement with the sheet, means connecting one end of said cylinder to a compressed air source, a valve interposed in said connecting means, and means on said table for opening said valve, means for operating said carriage attaching means to elevate the lead end of the sheet from the table and carry it forwardly upon continued movement of the table to a position above the initial portion of said inclined conveyor, and means for releasing said sheet when the lead end thereof is located above the initial portion of said inclined conveyor.

15. The combination defined in claim 14, in which said means for releasing said sheet includes a valve interposed in said evacuating means and positioned adjacent the upper end of said rails and a projection on said carriage for opening the valve to interrupt the vacuum to said vacuum cups.

No references cited.

HUGO O. SCHULZ, *Primary Examiner.*

UNITED STATES PATENT OFFICE
CERTIFICATE OF CORRECTION

Patent No. 3,194,417                                                 July 13, 1965

James M. Dunsmore et al.

It is hereby certified that error appears in the above numbered patent requiring correction and that the said Letters Patent should read as corrected below.

Column 6, line 4, after "said" insert -- second --.

Signed and sealed this 18th day of January 1966.

(SEAL)
Attest:

RNEST W. SWIDER                                      EDWARD J. BRENNER
ttesting Officer                                          Commissioner of Patents